Inventor
Josef Eicher

Aug. 23, 1966   J. EICHER   3,268,200

SEATS FOR VEHICLES

Filed Aug. 20, 1964   2 Sheets-Sheet 2

Inventor
Josef Eicher
By:
Attorney.

United States Patent Office 3,268,200
Patented August 23, 1966

3,268,200
SEATS FOR VEHICLES
Josef Eicher, 8011 Forstern, Kreis Erding, Germany
Filed Aug. 20, 1964, Ser. No. 390,961
Claims priority, application Germany, Aug. 24, 1963,
E 25,408
9 Claims. (Cl. 248—399)

This invention relates to a seat for vehicles especially tractors, of the kind that is supported at both sides by guides defining parallelograms which at their forward ends are pivotally connected to the seat and at their rear ends are pivotally connected to a support arranged on the vehicle behind the seat, and in which the lower guides abut a spring arrangement composed of springs and shock dampers, which arrangement is fixed to the support and is connected to the lower guides by means which are adjustable longitudinally of the guides.

In known seats of this kind the lower guides are extended beyond their pivot points on the support and these extensions are cranked to engage the lower ends of compression springs of which the upper ends bear against the support. The upper edges of two of the arms running longitudinally of the seat are provided with a plurality of ratchet teeth set one behind the other in which the lower ends of the compression springs may be selectively engaged in order to alter the spring pressure. Compression springs have the disadvantage that the softness of the springing is reduced as the springs are compressed, so that the softness of the springing is reduced as the weight of the driver is increased. The displacement of the springs from one ratchet tooth to the next is difficult and special precautions must be taken to ensure that under strong compression the compression springs cannot spring out of the grooves.

One object of the invention is to provide a seat for vehicles, especially tractors, which provides soft springing even for a driver of heavy weight and allows the adjustment of the spring strength to different body weights of drivers by simple means.

Another object is to provide a vehicle seat in which the spring arrangement is coupled at its lower end to a support rod which is fixed between swinging side plates carried on the lower guides between the two pivot points, and abuts against an adjusting wedge which is movable in the transverse direction of the seat.

A further object is to provide a vehicle seat in which the attachement point of the lower end of the spring arrangement lies between the two pivot points of the lower guides so that the use of tension springs becomes possible, which provide soft springing even under heavy loading.

Since the spring arrangement is coupled to a rod lying between the two side plates a number of softer tension springs may be used so that the softness of the springing may be still further increased. Additionally, since the support rod for the tension springs is carried in swinging side plates adjustable in the longitudinal direction of the seat, the initial tension of these tension springs may be adjusted by displacing the lower ends of the springs in the longitudinal direction of the seat. Finally, since the support rod abuts a wedge adjustable transversely of the seat the adjusting means may be both compact and practical.

The adjusting wedge should, furthermore, be movably supported on a lower rod fixed to the support parallel to the support rod and operate in conjunction with a guide stop fixed to the support rod, so that the whole adjusting means is of very simple construction.

The invention consists of a vehicle seat, especially for tractors, which is carried on both sides by parallelogram guides pivotally connected at their front ends with the seat and pivotally connected at their rear ends with a support arranged on the vehicle behind the seat, the lower guides abutting a spring arrangement composed of springs and shock dampers which is fixed to the support and is adjustable with respect to the lower guides in the longitudinal direction thereof, comprising a support rod connected to the lower guides between the pivot points thereof, and an adjusting wedge, the spring arrangement being connected to the support wedge, the spring arrangement being connected to the support rod, and the support rod bearing against the adjusting wedge.

Each upper guide is preferably composed of two members releasably joined together in known manner so that when the seat is not needed it may be turned over to protect it against rain and dirt.

In the drawings a practical example of the invention is shown in the form of a tractor seat.

Figure 1:
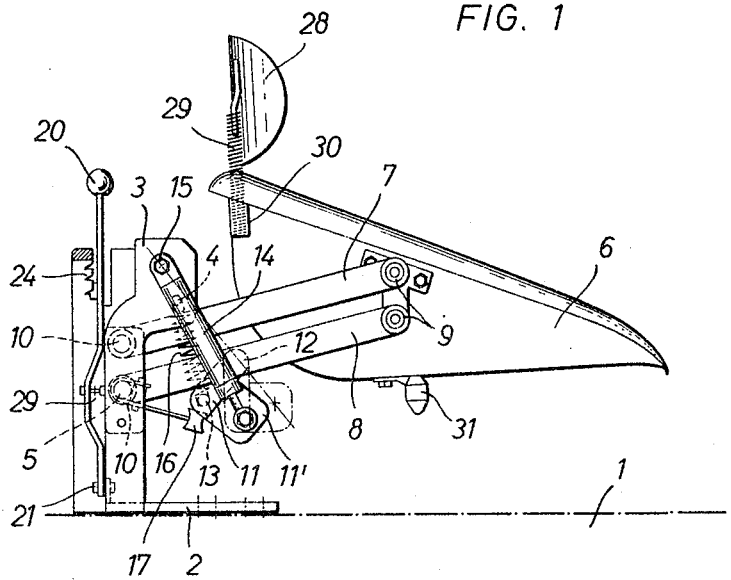
FIGURE 1 shows a side view of a tractor seat carried by a support.

Referring to the drawings, on a part 1 of the tractor is mounted a support 2 comprising two vertical arms 3 between which an upper rod 4 and, spaced therefrom, a lower rod or guide 5 are supported. On each side of the tractor seat 6 a parallelogram linkage is provided, consisting of an upper link or guide 7 and a lower link or guide 8, of which the forward ends are pivotally attached to the seat 6 and the rearward ends are pivotally attached to the vertical arms 3. In order to exclude all friction in the bearings of the linkage and to ensure that these will require no maintenance the pivots are composed of encapsulated and, if desired, grease-filled ball bearings 9 and 10.

Both of the lower links 8 are provided with downwardly projecting swinging side plates or arms 11 which are joined together by a support rod 13 fixed to rearward portions of the plates behind the pivot points 12 of these plates. On a part 11' projecting forwardly of the support rod 13 one end of a shock damper 14 is pivotally attached, the other end of the shock damper being supported at a point 15 beyond the fixing point of the rod 4.

Between the support rod 13 on the side plates 11 and the upper rod 4 on the vertical arms 3, a plurality of tension springs, in the form of helical springs, is fitted. A downwardly projecting abutment or follower 17 is fixed to the support rod 13, substantially at the middle of the rod, the abutment having the form of a roll with a central portion of reduced diameter. Against this abutment 17 bears an adjusting wedge or cam 18, the adjusting wedge 18 being in the form of an inclined plane which is turnably supported on the lower rod 5 between the vertical arms 3 by means of guide bushes 19 and is movable in the longitudinal direction of the rod 5 and transversely of the seat.

In the centre of the support 2 is a lever 20, pivoted at 21, which carries a lug 22 that is connected by means of a chain 23 with the adjusting wedge 18, the attachment of the chain being to the rear guide bush 19. The lever 20 co-operates with teeth 24 of a setting scale for different body weights of drivers, so that the adjusting wedge 18 may be moved along the rod 5 according to the body weight of the driver.

Figure 2:
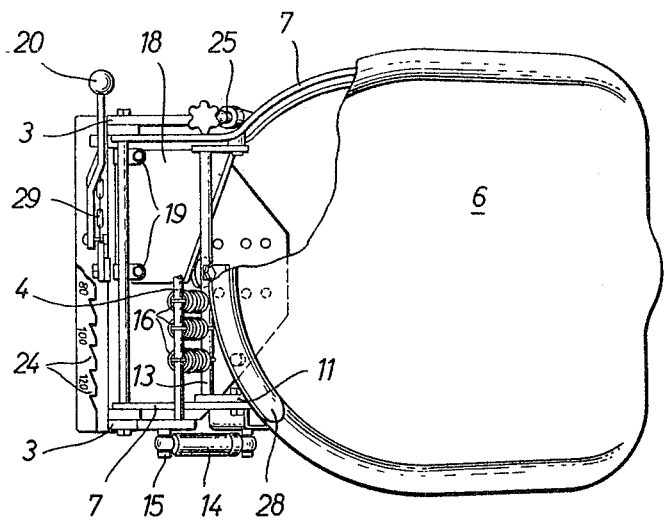
FIG. 2 is a plan view of the tractor seat partly broken away.
Figure 4:
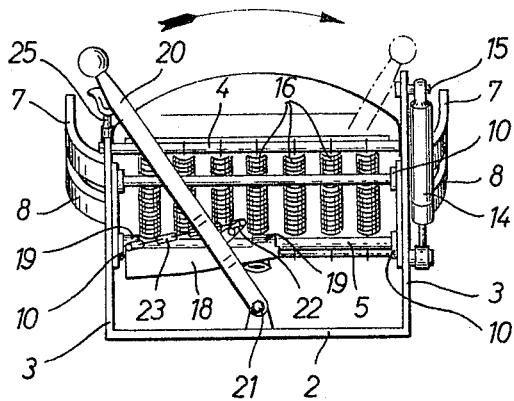
FIG. 4 is a rear view of the tractor seat.

In FIGURES 2 and 4 the lever 20 is set for the lightest body weight of the driver and the adjusting wedge 18 is shown in FIGURE 4 in the extreme left position.

If the adjusting wedge 18 is moved to a heavier weight position by moving the lever 20 clockwise the adjusting wedge 18 moves the support rod 13 by means of the abutment 17 towards the seat, so that the anchoring point of the tension springs 16 in FIGURE 1 is displaced to the right and its distance from the seat is shortened. At the same time, by movement of the adjusting wedge 18 the support rod 13 is moved through a small arc around the pivot point 12, so that by one movement of the lever to a heavier body weight position all the tension springs 16 are stretched. The shock damper 14, or a comparable shock damping arrangement, may be arranged between the vertical arms 3 and side plates 11. If the lever 20 is moved from the dot-and-dash line position in FIG. 4 anticlockwise for movement of the wedge 18 to a lighter weight position, and assuming that the seat is then unoccupied and spring-held in its uppermost position by the stop 26, the horizontal components of the spring forces on the rod 13 will through the abutment 17 ordinarily cam the wedge upwardly (FIG. 2), with resulting swinging of the arms 11 in clockwise direction (FIG. 1) and accompanying relaxation of the springs 16. Of course, movement of the wedge in response to a lighter weight setting of the lever 20 will occur once the seat is occupied if such wedge movement should not occur under the conditions just mentioned owing to inability of the prevailing spring forces to overcome the static friction involved.

On the side of the seat opposite to the shock damper a stop 26 is provided which is attached to a threaded rod 25 displaceable in the direction of the double-headed arrow A, the stop being in the form of a rubber buffer which is used to adjust the height of the seat 6 in cooperation with a stop 27 fixed to the lower guide. By means of this adjustment the height of the seat may be set for different body lengths, for example, the body lengths of children.

At the rear end of the driver's seat 6 is a shield plate 28 to cover the area of the driver's kidneys, which is supported by means of spiral springs inserted in blind sockets 30 fixed to the rear of the seat 6. In its mounted position the shield plate 28 stands slightly above the upper surface of the seat 6, so that the plate will easily bend backwards if the driver should lean back, without placing any strain on the driver. This plate is of especial importance because, even if a cabin is provided for the driver, the rear wall must often remain open to enable the driver to operate controls provided at the rear. Because the shield plate 28 is carried by springs 29 it will follow every movement of the driver without hindering him.

Figure 3:
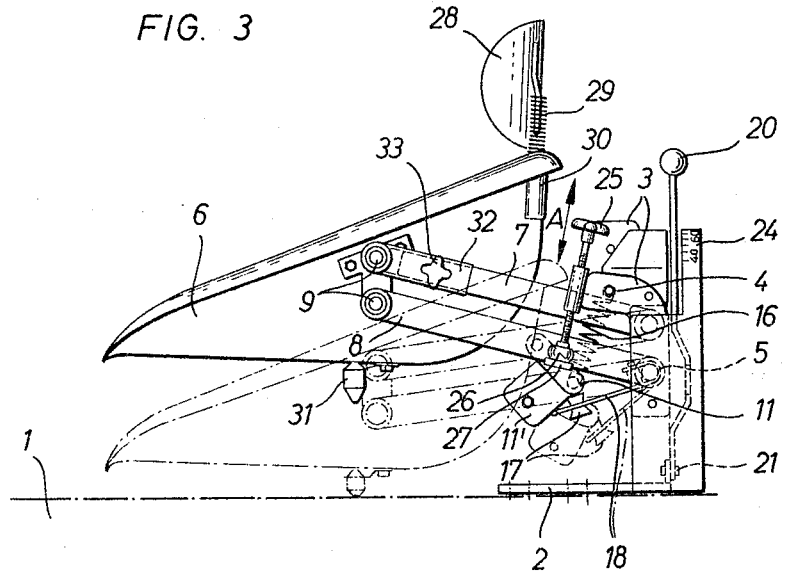
FIG. 3 is a view of the tractor seat as seen from the side opposite to that in FIG. 1.

FIGURES 1 and 3 show the room which is available underneath the driver's seat 6, because the whole seat support is at the rear of the seat. Because the seat guides 7 and 8 which carry the seat 6 are supported on tension springs 16, whose attachment point on the guides and initial tension may be set according to the driver's body weight, the correct spring force is provided for any body weight. For spring deflection, as these two figures show, the whole of the space between the seat 6 and the hydraulic or transmission casing 1 is available, so that the seat may move through a substantial distance for any body weight. The seat is provided on its undersurface with a resilient spring, preferably a rubber buffer 31, which is brought into contact with the casing 1 when the seat is fully sprung.

In order that the seat may be swung over or inverted when not in use so as to protect it against rain and other weather effects, each guide 7 of the upper set is divided into two sections and the one section, preferably that leading from the pivot point 9, is provided with a socket 32 in which the other section is adjustable and may be fixed by means of a set screw 33. By means of this socket 32 and set screw 33 it is also possible to provide the seat with a tilt.

I claim:
1. In a resilient suspension system for a vehicle seat, the combination with a fixed support, and pairs of links on opposite sides of the seat having first and second pivot connections with said support and seat, respectively, and forming therewith parallelograms swingable about said first pivot connections, of arm means having a follower and being pivotally mounted on said parallelograms intermediate said pivot connections about an axis parallel to the latter; a wedge adjacent and cooperating with said follower; spring means between and anchored to said support and arm means, with the spring anchorage on said arm means being remote from the pivot axis of the latter so that said spring means will back said arm means with its follower against said wedge with operational seat balancing forces varying with the seat load, said wedge being mounted for movement transversely of said parallelograms for swing response of varying amplitude of said arm means about its pivot axis to a static seat load and according variation of said operational spring forces; and means for adjusting said wedge in different transverse positions.

2. The combination in a resilient seat suspension system as set forth in claim 1, which further comprises stop means limiting the spring-urged upward swing of said parallelograms.

3. The combination in a resilient seat suspension system as set forth in claim 2, in which said stop means is heightwise adjustable.

4. The combination in a resilient seat suspension system as set forth in claim 1, in which said arm means provide a pair of arms pivoted on the respective parallelograms and connected by a rod, and said spring means are a plurality of tension springs anchored with one end to said support and with the other end to said rod.

5. The combination in a resilient seat suspension system as set forth in claim 1, in which said wedge is a plate further mounted for swinging movement about an axis transverse to said parallelograms so as to be swung by said follower on swing motion of said parallelograms.

6. The combination in a resilient seat suspension system as set forth in claim 5, in which said swing axis of said wedge is coextensive with the axis of one of said first pivot connections.

7. The combination in a resilient seat suspension system as set forth in claim 1, in which said adjusting means comprise a pivoted hand lever, a flexible connection between said lever and wedge for moving the latter on rocking the former, and fixed ratchet teeth for releasable interlock with said lever to arrest said wedge against movement from different transverse positions.

8. The combination in a resilient seat suspension system as set forth in claim 1, in which said link pairs have a set of upper links and a set of lower links, of which the links of one set are each formed of disconnectible sections to permit inversion of the seat when not in use.

9. The combination in a resilient seat suspension system as set forth in claim 1, which further comprises a shock damper between and pivotally connected at its ends with said support and with said arm means remote from the pivot axis of the latter.

References Cited by the Examiner

UNITED STATES PATENTS

| | | | |
|---|---|---|---|
| 2,574,057 | 11/1951 | Peterson | 248—400 X |
| 2,714,001 | 7/1955 | Hersey et al. | 267—20 |
| 2,829,703 | 4/1958 | Knoedler | 248—400 X |
| 2,877,825 | 3/1959 | Olson | 248—376 |
| 2,936,818 | 5/1960 | Harrington et al. | 248—399 |
| 2,949,153 | 8/1960 | Hickman | 248—399 |
| 3,178,148 | 4/1965 | Manke | 248—399 |

CLAUDE A. LE ROY, *Primary Examiner.*
CHANCELLOR E. HARRIS, R. P. SEITTER,
*Assistant Examiners.*